United States Patent [19]

Downing

[11] 4,282,627
[45] Aug. 11, 1981

[54] LARGE CLEARANCE FAIRLEAD GROMMET

[75] Inventor: James W. Downing, Buena Park, Calif.

[73] Assignee: McDonnell Douglas Corporation, Long Beach, Calif.

[21] Appl. No.: 970,356

[22] Filed: Dec. 18, 1978

[51] Int. Cl.² .......................... B65D 7/48; F16L 5/00
[52] U.S. Cl. ........................................ 16/2; 16/108; 174/153 G; 24/141; 285/162
[58] Field of Search ...................... 16/2, 108; 285/162; 174/153 G, 65 G, 152 G; 24/141, 142

[56] References Cited

U.S. PATENT DOCUMENTS

| | | | |
|---|---|---|---|
| 2,355,126 | 8/1944 | Webster et al. | 16/2 |
| 2,421,456 | 6/1947 | Judisch | 174/153 G |
| 2,518,851 | 8/1950 | Anderson | 16/2 |
| 2,961,691 | 11/1960 | Roy et al. | 16/2 |
| 3,016,562 | 1/1962 | Reid | 16/2 |

FOREIGN PATENT DOCUMENTS 477879  1/1938  United Kingdom ................ 179/152.2

OTHER PUBLICATIONS

Published Abstract 604,053, Fairbairn et al., Dec. 13, 1949.
Standards Manual, Standard NAS557, Revised 9-1-70, McDonnell Douglass Corporation.

Primary Examiner—Andrew V. Kundrat
Attorney, Agent, or Firm—Paul T. Loef; Walter J. Jason; Donald L. Royer

[57] ABSTRACT

A one piece fairlead grommet for protecting an aircraft control cable where penetrating a bulkhead or cable support panel. The fairlead grommet has a generally cylindrical body with frustro conically shaped flanges and a through-slot, generally, longitudinally oriented. The slot forms an angle with a radius line drawn from the center of the grommet bore to permit the slot surfaces to be readily offset and the grommet collapsed around the control cable for installation with the control cable in place. The slot is further biased on a diagonal with respect to the horizontal axis of the grommet bore to ensure a wearing surface in contact with the cable at the slot.

9 Claims, 2 Drawing Figures

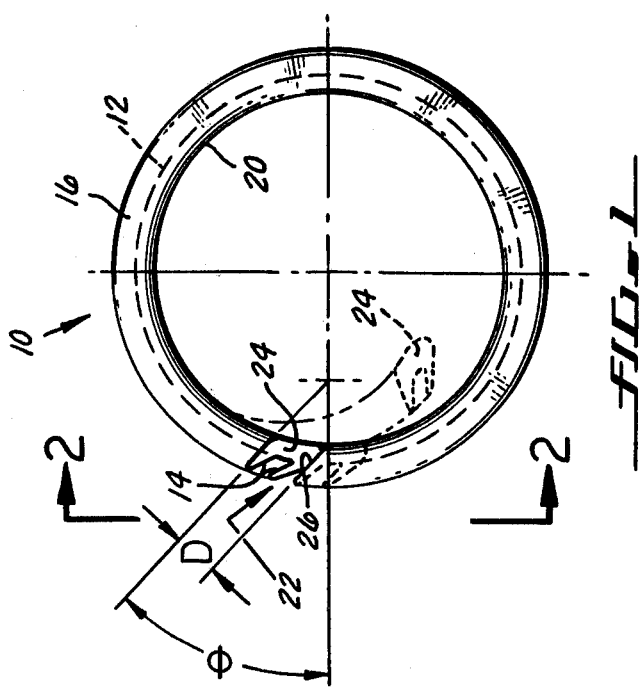
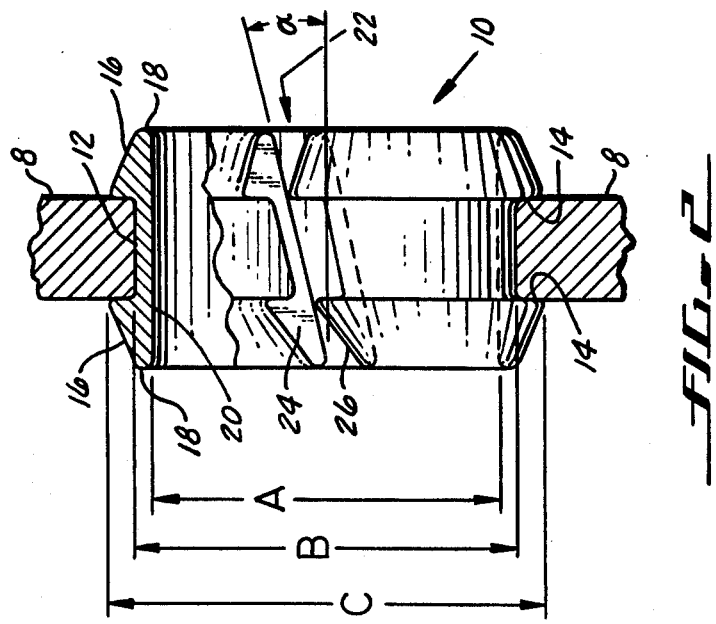

LARGE CLEARANCE FAIRLEAD GROMMET

BACKGROUND OF THE INVENTION

This invention relates generally to grommets, and more particularly to an aircraft control cable fairlead grommet of one piece construction which can be installed with the control cable in place.

Fair lead grommets are employed to protect aircraft control cables wherever the cable penetrates a bulkhead or cable support is required. Control cables, of course, are exciteable at their natural frequency and multiples thereof. Unless restrained, large cable excursions not only damages the cables but may damage adjacent equipment. Control cables are normally restrained by running them through a fairlead and to protect the cable from chafing a fairlead grommet is installed between the cable and the fairlead.

While many innovative grommet designs are available, none of the available grommets function satisfactorily in an environment where condensation occurs on the control cable which may later freeze and form ice. Particularly poor performers in this environment are the close fitting grommets, and particularly those having an hour-glass shaped bore. Ice formed on the cable jams in the conical shape of the bore when the cable is moved in the proper direction. While ice does not generally adhere well to the plastic material used in the grommet, it readily adheres to the control cable and if the grommet is provided with slots and crevices, the ice will form in these voids and lock the cable without need for strong adhesion to the plastic material. Slots, crevices, and voids are most common with multiple element grommets.

In summary, contemporary aircraft control cable fairlead grommets function poorly when exposed to condensation followed by icing conditions. Also, some grommets are difficult to replace without removing the control cable.

SUMMARY OF THE PRESENT INVENTION

It is an important object of the present invention to provide a simple, one piece, low cost fairlead grommet with the absence of crevices and voids to prevent water collection and subsequent ice formations which may lock the cable to the grommet and at the same time accommodate some ice on the cable by providing adequate clearance between the grommet and the cable.

Another important object of the present fairlead grommet is to provide a grommet which may be removed and reinstalled with the control cable in place.

In summary, the fairlead grommet of this invention accomplishes the above objects and overcomes the disadvantages of prior grommets by providing a generally cylindrical body having a central bore which provides reasonably large clearances to the control cable. The cylindrical body is longitudinally disposed between the distal ends of the body which are frustro-conically shaped to present an inclined plane to the fairlead hole during installation of the grommet. The through-slot, generally longitudinally oriented, is provided at one place on the perimeter of the grommet communicating from flange to flange and from the outside diameter to the bore, providing a split in the ring. The through-slot is more specifically oriented diagonally to the longitudinal axis of the bore so as to present a wearing surface to the cable inasmuch as the cable must ride diagonally across the slot. The slot, when viewed in a plane perpendicular to the horizontal axis of the bore, is oriented to form an angle with a radius line drawn from the center of the bore. This slot angle is necessary so that when pressure is applied to the perimeter of the grommet, the slot surfaces radially displace and the grommet spirals within itself to reduce in diameter so as to enter the fairlead hole. The conically-shaped flange on the grommet assists in the installation process by applying circumferential pressure to the spiralled grommet. Since the outside diameter of the grommet body between the flanges is larger than the hole in the fairlead, once the flange clears the hole, the grommet springs back towards its original diameter and is retained by the flanges.

BRIEF DESCRIPTION OF THE DRAWINGS

With reference to the drawings, wherein like reference numberals designate like portions of the invention:

FIG. 1 is an enlarged plan view of the un-installed grommet; and

FIG. 2 is an end view projection of the plan view shown in FIG. 1 showing the slot at a slightly oblique projection, and a partial section to illustrate a cross section of the installed grommet.

DESCRIPTION OF THE PREFERRED EMBODIMENT

FIG. 1 is a plan view of the one-piece fairlead grommet 10 of this invention. The reference or phantom lines shown in this figure depict the grommet in a partially spiral or collapsed position preparatory to installation which will be discussed infra. The grommet 10 consists of a generally cylindrical portion 12 which engages the fairlead 8. The cylindrical body section 12 terminates on either side in a flange 14 which are generally identical mirror images. The flange 14 is frustro-conically shaped and has a conical surface 16 which may terminate in a generally contoured end portion 18 which itself terminates in the through-bore 20.

The grommet is provided with a through-slot at 22. The through-slot 22, when viewed in a plane perpendicular to the horizontal axis of the through-bore 20, forms an angle with a radius line drawn from the center of said through-bore 20 as depicted by the angle $\theta$ in FIG. 1. The preferred angle is between 40° and 50°. It is essential that the angle be struck from an apex point other than the center of the bore 20. Hence when a compressive force is applied to the circumference of the ring as at 16 there is a force component tending to radially dispose the through-slot surfaces 24 and 26 in a spiralling or colapsing fashion as shown in reference in FIG. 1. The through-slot 22 is further oriented, when viewed in a plane parallel to the horizontal axis of the bore 20, to form an angle $\delta$ of at least 10° with the axis of the bore 20. This diagonal orientation is required to ensure that the control cable, not shown, rides across rather than in the slot 22. While it is preferred that the slot surfaces 24 and 26 are parallel prior to installation of the grommet 10 in the fairlead 8 it is important to controll the variations so that when the slot surfaces 24 and 26 are engaged by compressing the outside diameter of the grommet 10, the slot surfaces contact first at the bore surface 20.

The width of the gap of the slot 22 between the slot surfaces 24 and 26 must be controlled to minimize the amount of the gap remaining after installation of the grommet 10 in the fairlead 8. The diameter of the cylindrical body 12 is larger than the aperture in the fairlead 8 which is necessary to retain the grommet in the fairlead. These two dimensions control the width of the gap of the through-slot 22 after installation in the fairlead 8.

Where the grommet 10 is of an appropriate size to use with a 0.500 to 0.510 inch diameter fairlead hole and support a ⅛ inch diameter cable therein, the cylindrical body diameter B as indicated in FIG. 2 can be illustratively 0.510 to 0.515 inch with a gap D of 0.065 to 0.075 inch. In this illustrative size, the bore A is 0.460 to 0.470 inches and the outside diameter of the flange 14 shown as C is 0.577 to 0.581 inch. Another illustrative example of the same grommet 10 for a 1/16 or 3/32 inch diameter cable would have the following dimensions for A through D: 0.270 to 0.280, 0.317 to 0.321, 0.356 to 0.360 and 0.065 to 0.075 respectively, all in inches and the fairlead hole would measure 0.302 to 0.306 inch diameter.

The procedure for installing the fairlead grommet 10 is to apply circumferential pressure to the perimeter of the grommet, causing the grommet to colapse or spiral as shown in reference lines in FIG. 1. Further compression of the grommet results in a spiral whose outside diameter approaches the hole in the fairlead. When the spiralled grommet is pressed against the hole in the fairlead 8, the frustro conically-shaped flange surface 16 enters the hole and further compresses the grommet until the flange 14 clears the fairlead. The resilient and flexible grommet then springs into a locked position with the flanges 14 abutting opposite sides of the fairlead 8. A similar procedure is employed to remove the grommet.

Tests and experience indicate that teflon (polytetrafluoroethylene) filled nylon is currently the best material for this particular fairlead grommet considering resiliency, coefficient of friction, tensile strength, ability to withstand temperature variations, and compatibility with molding type fabrication processes.

It may thus be seen that the fairlead grommet depicted in the embodiment of this invention, serves to solve the indicated problems encountered where aircraft control cables accumulate moisture condensation followed by a freezing environment.

What is claimed is:

1. A fairlead grommet for an aircraft control cable comprising:
   a generally cylindrical body with frustro conically shaped flanges disposed longitudinally at the distal ends of said cylindrical body, oriented with the smaller diameter at the distal end and said cylindrical body having a longitudinal through-bore, centrally disposed with respect to the cylindrical body;
   a through-slot generally longitudinally formed through said cylindrical body and extending the length thereof between said distal ends from the outer diameter of said flanges into communication with said bore, said through-slot, when viewed in a plane perpendicular to the horizontal axis of said bore, forms an angle with a radius line drawn from the center of said through-bore and said slot is further oriented to form an angle with the horizontal axis of said through-bore when viewed in a plane parallel to the horizontal axis of said bore; and
   said grommet being made from a comparatively stiff, shape retaining material, with sufficient spring and a low coefficient of friction in sliding against itself to permit said cylindrical body to spiral with the application of axial pressure on the frusto-conical surface of said flanges of said grommet and springs back to said cylindrical shape when the pressure is released.

2. A fairlead grommet for aircraft control cables as recited in claim 1, wherein said through-slot when viewed in a plane perpendicular to the horizontal axis of said bore forms an angle with a radius line drawn from the center of said through-bore measuring between 40 and 50 degrees.

3. A fairlead grommet for aircraft control cables as recited in claim 1, wherein said through-slot, when viewed in a plane parallel to the horizontal axis of said bore, forms an angle of at least 10 degrees with said horizontal axis whereby said control cable bears across said through-slot.

4. A fairlead grommet for aircraft control cables as recited in claim 1, wherein the width of said through-slot is controlled in relationship to the pre-installation diameter of said cylindrical body between said frustro conically shaped flanges so that when said fairlead is installed said through-slot is essentially closed.

5. A fairlead grommet for aircraft control cables as recited in claim 1, wherein said fairlead is made from a teflon filled nylon.

6. A fairlead grommet for aircraft control cables as recited in claim 1, wherein the largest diameter of said frustro conically shaped flange is such that when said through-slot surfaces are radially disposed so as to not oppose each other and said cylindrical body is circumferentially compressed about said control cable while said slot surfaces are so disposed said generally cylindrical body reduces in size to approach the pre-installation diameter of said through-bore, whereby said fairlead may be installed or removed without removing said control cable.

7. A fairlead grommet for aircraft control cables as recited in claim 1, wherein said generally cylindrical body has contoured distal end portions.

8. A fairlead grommet for aircraft control cables as recited in claim 1, wherein said slot surfaces form an angle between 0 and 15 degrees with the apex located at said bore surface when said generally cylindrical body is circumferentially compressed to engage said slot surfaces.

9. A fairlead grommet for aircraft control cables as recited in claim 1, wherein said through-bore is at least 2½ times said control cable diameter when said grommet is installed so as to prevent ice buildup between the cable and the grommet.

* * * * *